US 11,311,954 B2

(12) United States Patent
Sakaguchi

(10) Patent No.: US 11,311,954 B2
(45) Date of Patent: *Apr. 26, 2022

(54) CORE MOVING DEVICE OF WIRE ELECTRIC DISCHARGE MACHINE

(71) Applicant: SODICK CO., LTD., Kanagawa (JP)

(72) Inventor: Masashi Sakaguchi, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 365 days.

This patent is subject to a terminal disclaimer.

(21) Appl. No.: 16/595,520

(22) Filed: Oct. 8, 2019

(65) Prior Publication Data

US 2020/0114444 A1    Apr. 16, 2020

(30) Foreign Application Priority Data

Oct. 12, 2018  (JP) .............................. JP2018-193274

(51) Int. Cl.
*B23H 7/38* (2006.01)
*B23H 7/08* (2006.01)
*B23H 11/00* (2006.01)
*B23Q 3/15* (2006.01)

(52) U.S. Cl.
CPC ................. *B23H 7/38* (2013.01); *B23H 7/08* (2013.01); *B23H 11/00* (2013.01); *B23Q 3/15* (2013.01)

(58) Field of Classification Search
CPC . B23H 7/38; B23H 7/08; B23H 11/00; B32H 7/02; B23Q 3/15
See application file for complete search history.

(56) References Cited

U.S. PATENT DOCUMENTS

| 3,926,316 A | * | 12/1975 | Luttrell | ................... | B66C 23/48 |
| | | | | | 212/259 |
| 4,813,729 A | * | 3/1989 | Speckhart | ............. | H01F 7/0257 |
| | | | | | 294/65.5 |
| 5,433,492 A | | 7/1995 | Glossop, Jr. | | |

(Continued)

FOREIGN PATENT DOCUMENTS

| JP | S54140351 | | 10/1979 |
| JP | H03079227 | | 4/1991 |
| JP | 2002103144 A | * | 4/2002 |

OTHER PUBLICATIONS

Machine translation of Japan Patent No. 2002-103,144, Dec. 2021 (Year: 2021).*

(Continued)

*Primary Examiner* — Geoffrey S Evans
(74) *Attorney, Agent, or Firm* — JCIPRNET

(57) ABSTRACT

A core moving device is provided, including a core adsorption holding part for adsorbing and moving a core cut out of a workpiece with a magnetic force of a magnet. The core adsorption holding part includes: a rod member, a distal end portion of which is constituted of the magnet; a bottomed cylindrical member which has a bottom surface on a distal end portion side and into which the rod member is inserted from a base end portion side; and a cylindrical member drive part which moves the bottomed cylindrical member forward, wherein the bottomed cylindrical member, on one hand, moves backward to adsorb the core to the magnet and, on the other hand, moves forward to remove the core adsorbed to the magnet.

10 Claims, 12 Drawing Sheets

(56) References Cited

U.S. PATENT DOCUMENTS

| | | | | |
|---|---|---|---|---|
| 5,799,999 | A | * | 9/1998 | Schneider ............... B25B 9/00 |
| | | | | 294/65.5 |
| 6,056,339 | A | * | 5/2000 | Berger .................... B25B 9/00 |
| | | | | 294/65.5 |
| 9,010,444 | B2 | * | 4/2015 | Quitberg ............... E21B 23/00 |
| | | | | 166/381 |
| 2013/0126188 | A1 | | 5/2013 | Quitberg |
| 2020/0047271 | A1 | | 2/2020 | Sakaguchi |

OTHER PUBLICATIONS

Sodick Co.,Ltd., Japanese patent application No. 2018148293, not yet published, with English abstract, filed on Aug. 7, 2018.

"Office Action of China Counterpart Application", dated Sep. 29, 2020, with English translation thereof, p. 1-p. 14.

"English translation of Office Action of Japan Counterpart Application," dated Jul. 29, 2019, p. 1-p. 4.

\* cited by examiner

CORE MOVING DEVICE OF WIRE ELECTRIC DISCHARGE MACHINE

CROSS-REFERENCE TO RELATED APPLICATION

This application claims the priority benefit of Japan application serial no. 2018-193274, filed on Oct. 12, 2018. The entirety of the above-mentioned patent application is hereby incorporated by reference herein and made a part of this specification.

BACKGROUND

Technical Field

The disclosure relates to a core moving device of a wire electric discharge machine including a core adsorption holding part, which adsorbs a core cut out of a workpiece using wire electric discharge machining with a magnetic force of a magnet, and configured to move the core by moving the core adsorption holding part relative to the workpiece.

Description of Related Art

A core moving device of a wire electric discharge machine is illustrated, for example, by the core extraction device of the electric discharge machine of Patent Document 1. The core extraction device of Patent Document 1 includes an arm that rotates in a horizontal direction and moves up and down in a vertical direction. A magnet for adsorbing the core is attached to a distal end of the arm. The core adsorbed by the magnetic force of the magnet is removed from the magnet against the magnetic force when a protrusion of the distal end of the arm protrudes toward the core. However, the protrusion pushes one point on the surface of the core, which faces the magnet. In the core pushed by the protrusion, there is a possibility that only a portion close to the protrusion is separated from the magnet and a portion far away from the protrusion is not separated from the magnet.

Then, the applicant of the present application has proposed the core moving device of the wire electric discharge machine of Patent Document 2. The core moving device of Patent Document 2 includes a core adsorption holding part, which adsorbs a core cut out of a workpiece by wire with a magnetic force of a magnet and moves relative to the workpiece. The core adsorption holding part adsorbs the core with the magnet provided at a distal end portion of a rod member. The rod member is inserted into a cylindrical member. The cylindrical member, on one hand, moves backward relative to the rod member to expose a distal end surface of the rod member so that the core is adsorbed to the distal end surface of the rod member by the magnet and, on the other hand, moves forward relative to the rod member to protrude beyond the distal end surface of the rod member so that the core adsorbed to the distal end surface of the rod member by the magnet is pushed out against the magnetic force and removed.

The core moving device of Patent Document 2 still has room for improvement. The core that fits in the inner hole of the cylindrical member cannot be removed from the rod member using the cylindrical member. Therefore, the inner hole of the cylindrical member is made smaller than the core. If the inner hole of the cylindrical member is made smaller, it is necessary to make the rod member smaller. If the size of the rod member is reduced, the size of the magnet needs to be reduced. For magnets made of the same material, the adsorption force generated by the magnetic force decreases as the size is reduced. If the inner hole of the cylindrical member is made smaller, it may not be possible to adsorb and hold a heavy core with the magnet. For the core moving device of Patent Document 2, the cylindrical member, the rod member, and the magnet may need to be replaced with those having the required sizes in a timely manner to match the size of the core.

In wire electric discharge machining, for example, the movement path of the wire electrode can be made into a spiral shape, and the core can be machined by electric discharge machining to a predetermined size or smaller or completely with no core left. The machining time is increased by the time for reducing the size of the core in electric discharge machining. A start hole is machined in advance in a portion that is to be cut out of the workpiece as the core. The wire electrode passing through the start hole moves in a predetermined path to cut the core out of the workpiece. A core formed with a large start hole is light. However, as the core formed with a large start hole has a small area to be adsorbed by the magnet, the core may not be held stably when adsorbed by the magnet.

Related Art

Patent Documents

[Patent Document 1] Japanese Patent Laid-Open No. H03-079227
[Patent Document 2] Japanese Patent Application No. 2018-148293

SUMMARY

A core moving device (2) of a wire electric discharge machine (1) according to the disclosure includes a core adsorption holding part (20) which adsorbs a core (WP1) cut out of a workpiece (WP) with a magnetic force of a magnet (21) and moves the core relative to the workpiece. The core adsorption holding part includes: a rod member (22) at least a distal end portion of which is constituted of the magnet; a bottomed cylindrical member (23) which has a bottom surface (23b) on a distal end portion and into which the rod member is inserted from a base end portion; and a cylindrical member drive part (25) which moves the bottomed cylindrical member forward relative to the rod member to at least the distal end portion side of the rod member, wherein the bottomed cylindrical member, on one hand, moves backward relative to the rod member to the base end portion side of the rod member to be capable of adsorbing the core with the magnetic force of the magnet and, on the other hand, moves forward relative to the rod member to the distal end portion side of the rod member to be capable of pushing out and removing the core adsorbed by the magnetic force of the magnet against the magnetic force.

DESCRIPTION OF THE EMBODIMENTS

Figure 1:
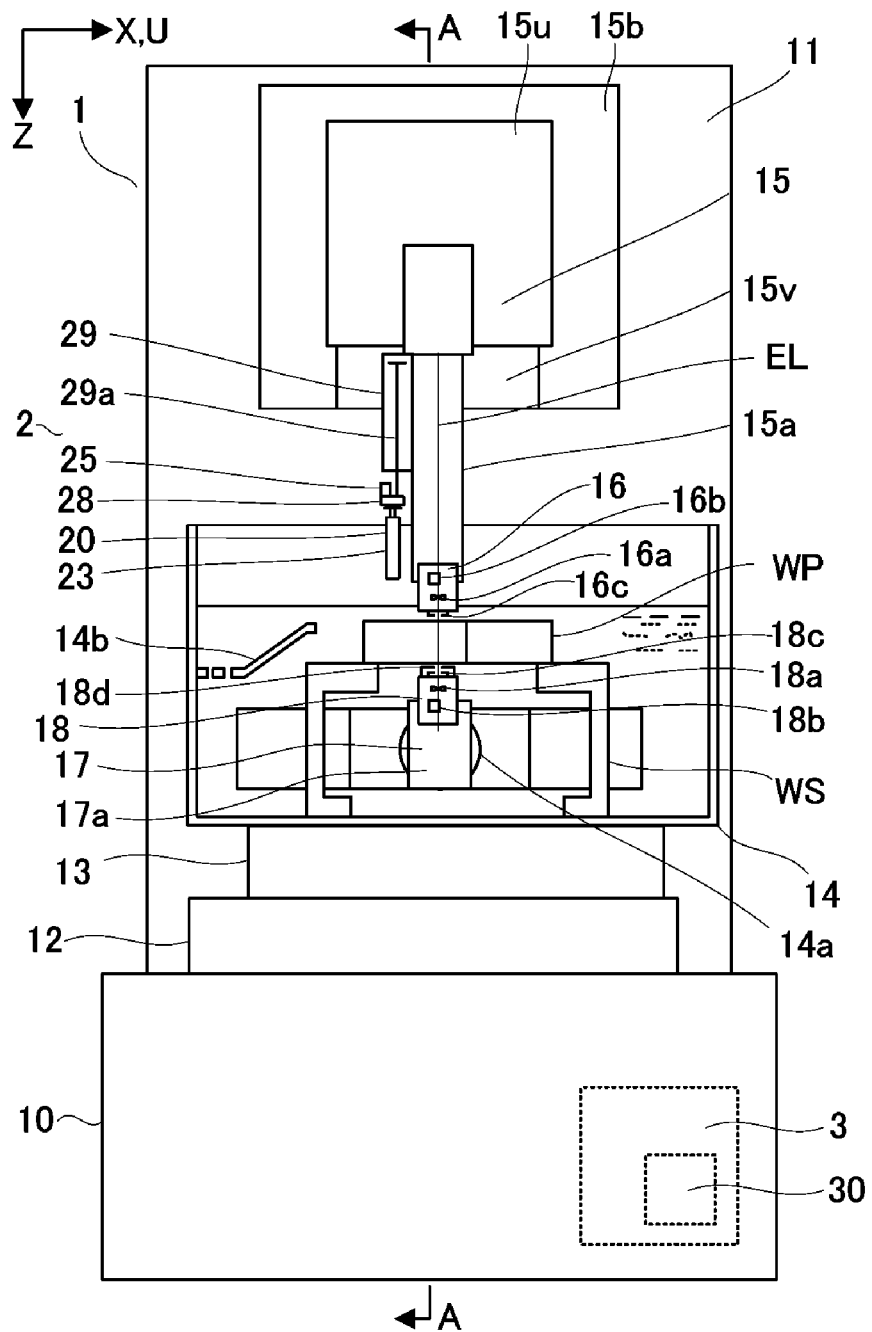
FIG. 1 is a front cross-sectional view schematically illustrating a wire electric discharge machine including a core moving device according to an embodiment of the disclosure.

The disclosure provides a core moving device of a wire electric discharge machine that can adsorb cores of various sizes and various weights to the core adsorption holding part with the magnetic force of the magnet and reliably hold the cores, and reliably remove the cores of various sizes and various weights adsorbed by the magnetic force of the magnet from the core adsorption holding part against the magnetic force of the magnet at a predetermined timing. In addition, the disclosure provides a core moving device of a wire electric discharge machine that can omit the process of replacing the cylindrical member, the rod member, and the magnet with those having the required sizes according to the size or weight of the core. Also, the disclosure provides a core moving device of a wire electric discharge machine that can move the core reliably. The disclosure further provides a core moving device of a wire electric discharge machine that is small in size and has a simple configuration. Additional objects and advantages of the disclosure will be set forth in the description that follows.

A core moving device (2) of a wire electric discharge machine (1) according to the disclosure includes a core adsorption holding part (20) which adsorbs a core (WP1) cut out of a workpiece (WP) with a magnetic force of a magnet (21) and moves the core relative to the workpiece. The core adsorption holding part includes: a rod member (22) at least a distal end portion of which is constituted of the magnet; a bottomed cylindrical member (23) which has a bottom surface (23b) on a distal end portion and into which the rod member is inserted from a base end portion; and a cylindrical member drive part (25) which moves the bottomed cylindrical member forward relative to the rod member to at least the distal end portion side of the rod member, wherein the bottomed cylindrical member, on one hand, moves backward relative to the rod member to the base end portion side of the rod member to be capable of adsorbing the core with the magnetic force of the magnet and, on the other hand, moves forward relative to the rod member to the distal end portion side of the rod member to be capable of pushing out and removing the core adsorbed by the magnetic force of the magnet against the magnetic force.

In addition, in the core moving device (2) of the wire electric discharge machine (1) according to the disclosure, the bottomed cylindrical member (23) may have at least one opening (23c), with a part of the bottom surface (23b) left, on a distal end portion of the bottomed cylindrical member.

Furthermore, in the core moving device (2) of the wire electric discharge machine (1) according to the disclosure, the rod member (22) may include at least one protrusion (22b), which is exposed from the opening (23c) when the bottomed cylindrical member (23) moves backward, on the distal end portion of the rod member.

The core moving device of the wire electric discharge machine according to the disclosure can adsorb cores of various sizes and various weights to the core adsorption holding part with the magnetic force of the magnet and reliably hold the cores, and reliably remove the cores of various sizes and various weights adsorbed by the magnetic force of the magnet from the core adsorption holding part against the magnetic force of the magnet at the predetermined timing. In addition, for the core moving device of the wire electric discharge machine according to the disclosure, the process of replacing the cylindrical member, the rod member, and the magnet with those having the required sizes according to the size or weight of the core can be omitted. Also, the core moving device of the wire electric discharge machine according to the disclosure can move the core reliably. Furthermore, the core moving device of the wire electric discharge machine can be made small in size and have a simple configuration.

Figure 2:
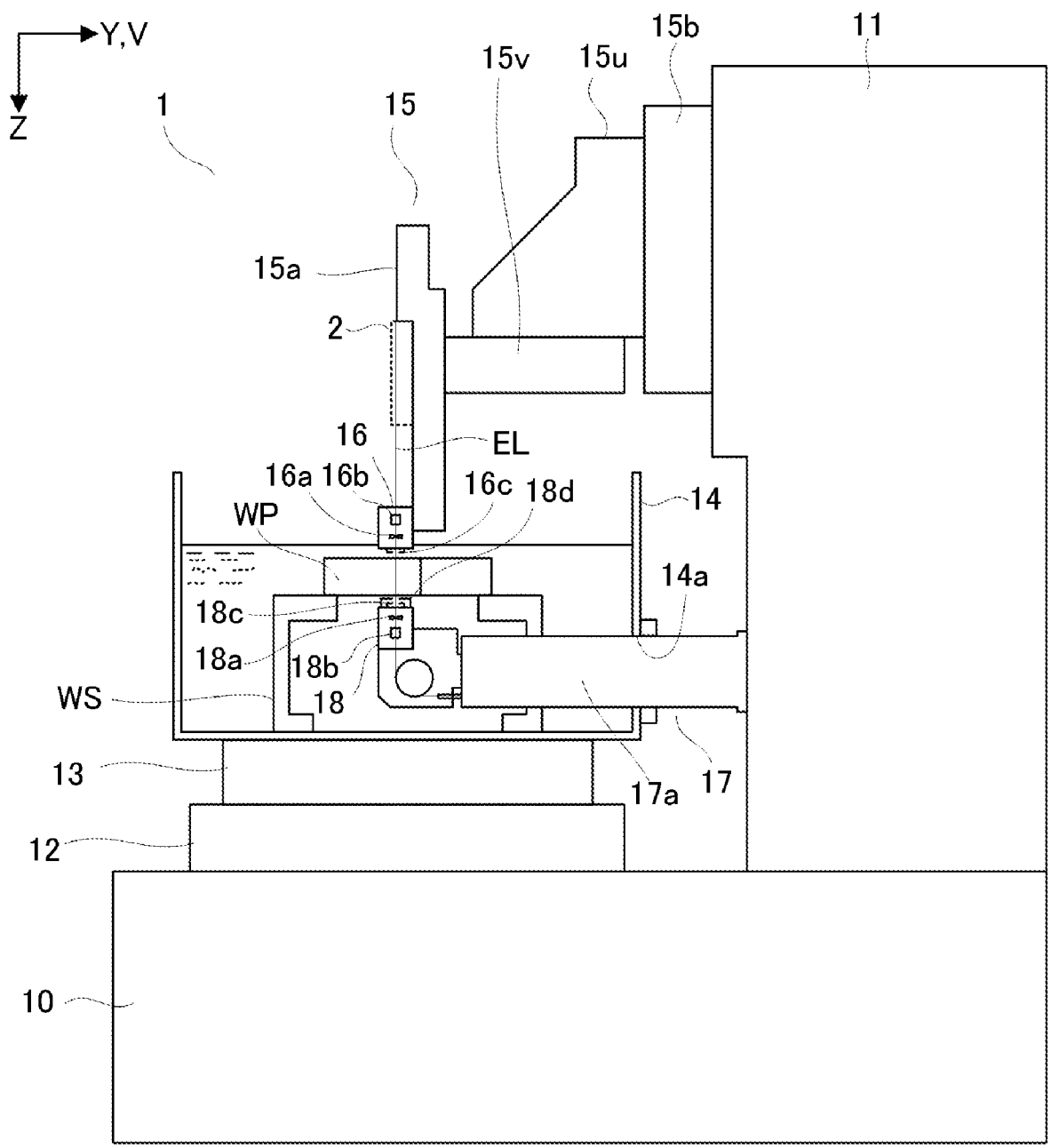
FIG. 2 is a side cross-sectional view taken along the line A-A of FIG. 1.
Figure 3:
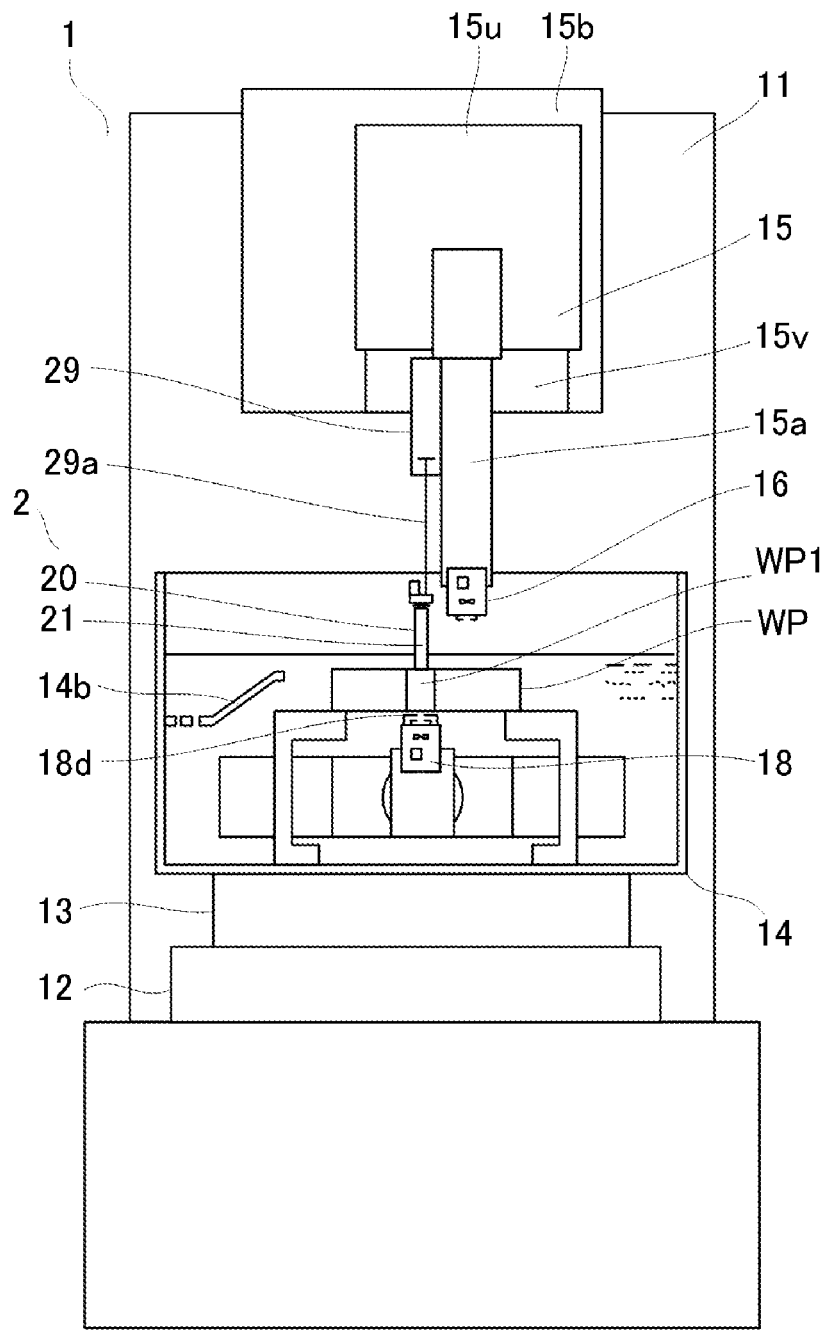
FIG. 3 is a schematic view illustrating a state of a core adsorption holding part to which a core is adsorbed.
Figure 4:
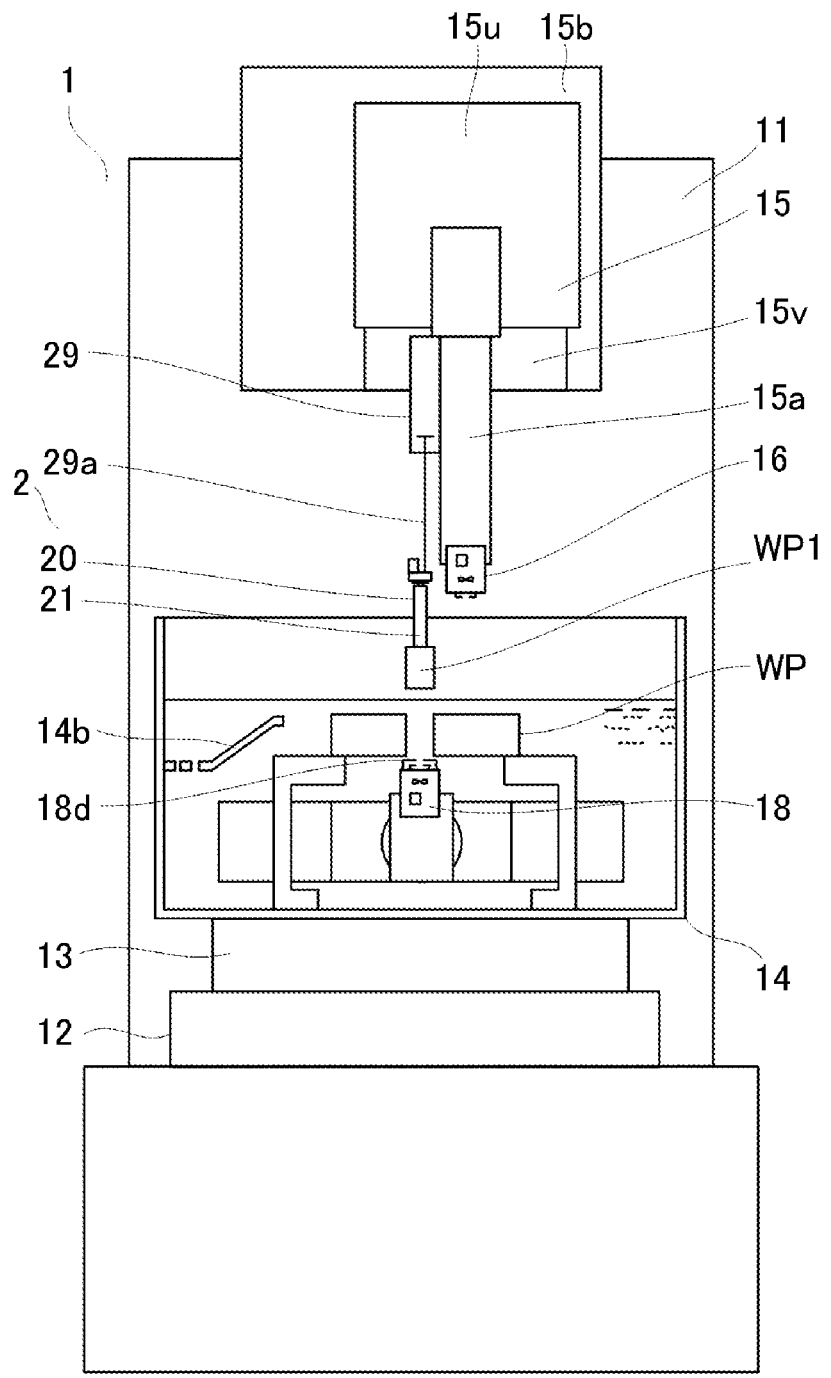
FIG. 4 is a schematic view illustrating a state in which the core adsorption holding part to which the core is adsorbed is raised and the core is extracted out of a workpiece.
Figure 5:
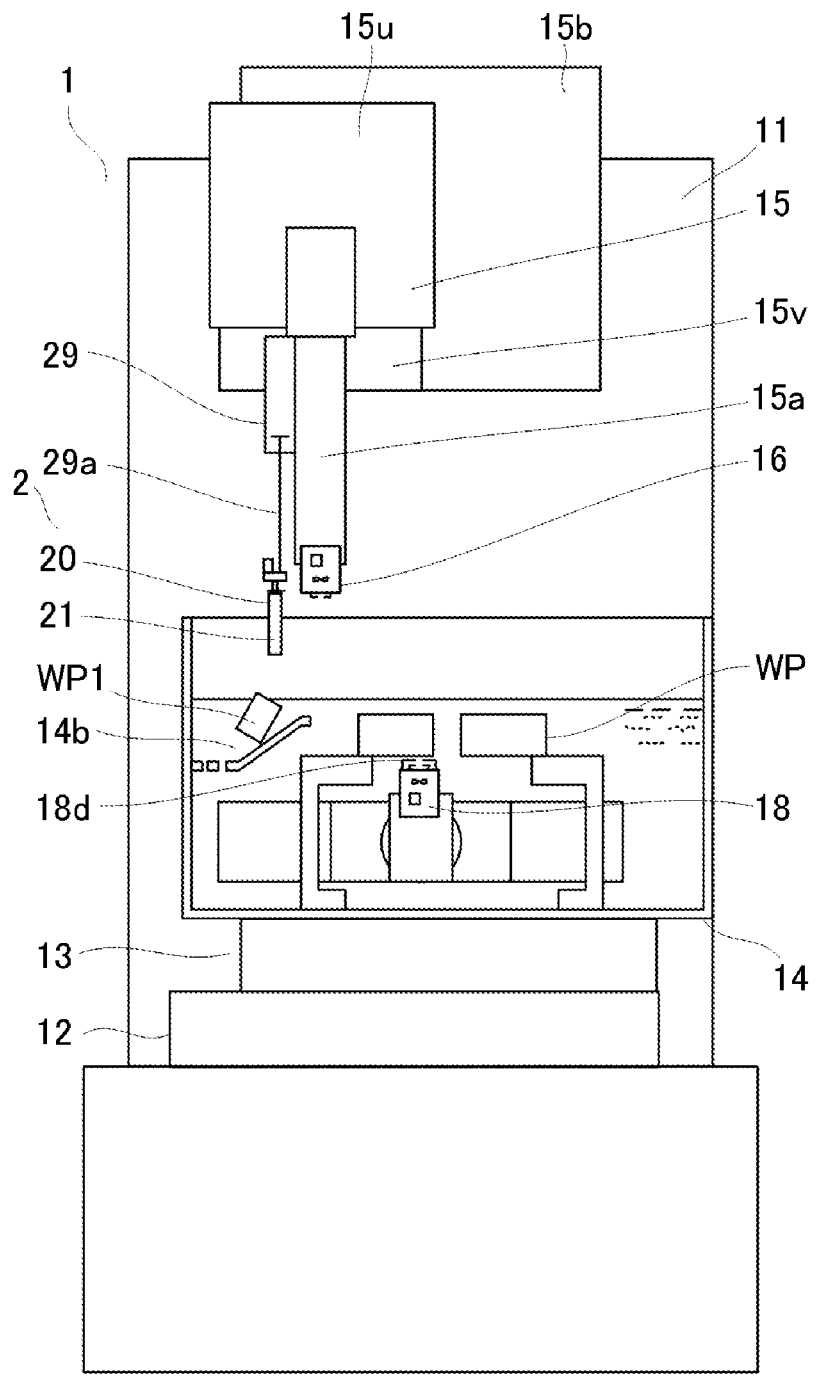
FIG. 5 is a schematic view illustrating a state in which the core adsorption holding part to which the core is adsorbed is moved above a core recovery bucket and the core is removed from the core adsorption holding part.
Figure 6:
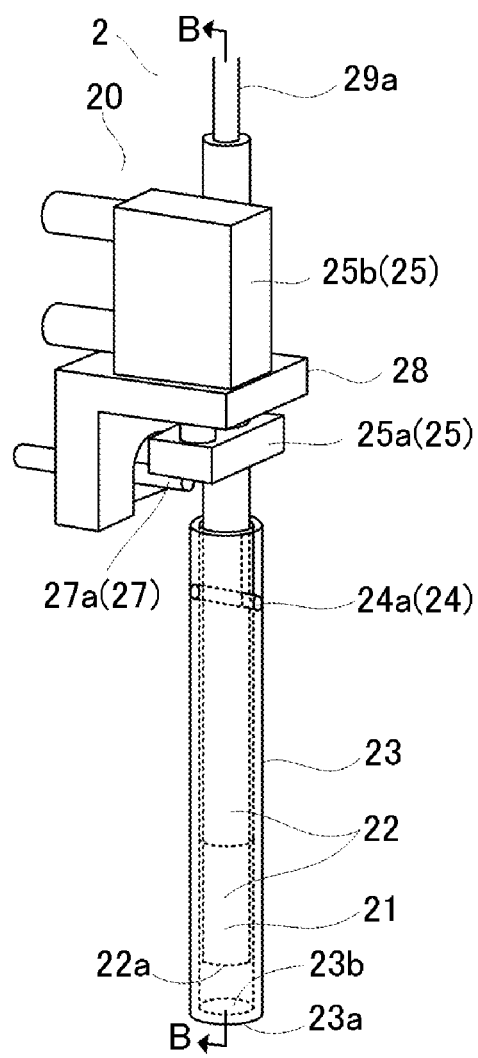
FIG. 6 is a perspective view schematically illustrating the core adsorption holding part of the core moving device of the disclosure.
Figure 7:
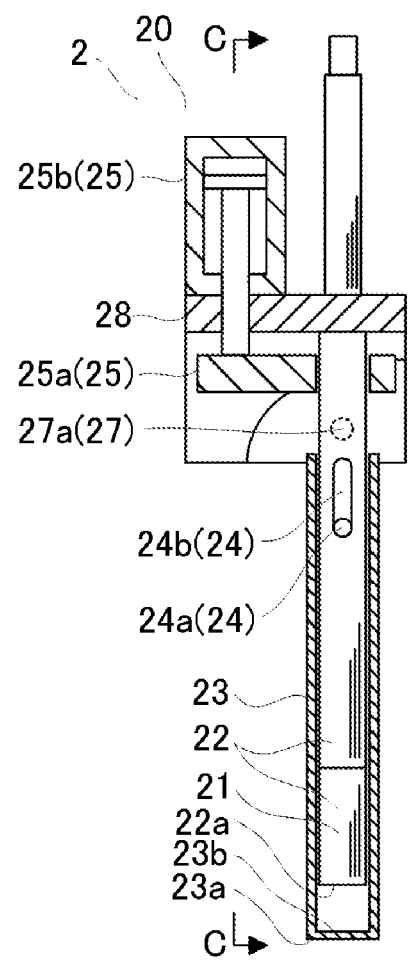
FIG. 7 is a front cross-sectional view taken along the line B-B of FIG. 6.
Figure 8:
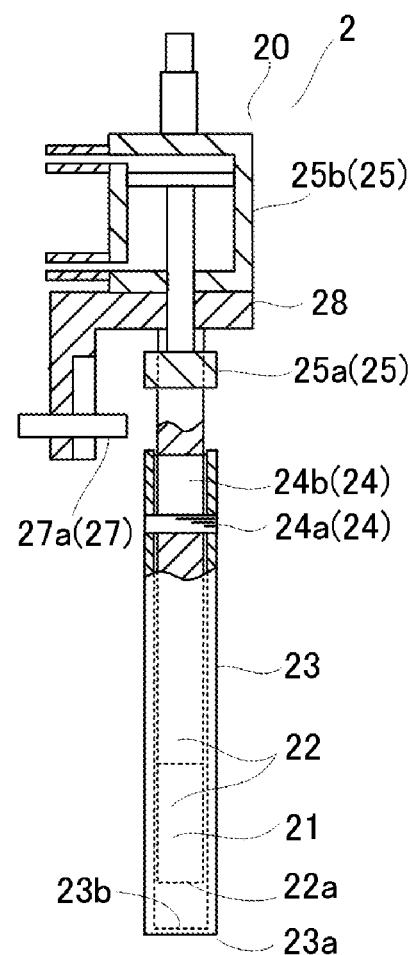
FIG. 8 is a cross-sectional view taken along the line C-C of FIG. 7 and is a side cross-sectional view schematically illustrating the core adsorption holding part before the core is adsorbed thereto.
Figure 9:
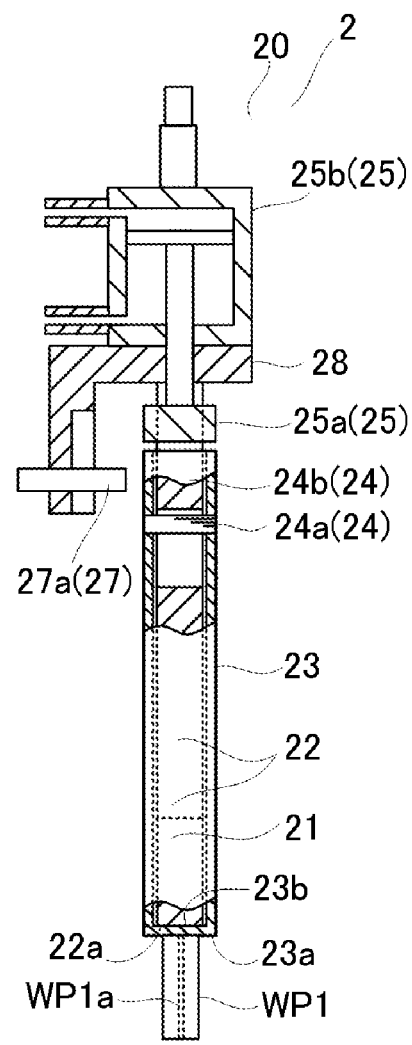
FIG. 9 is a side cross-sectional view schematically illustrating the core adsorption holding part when the core is adsorbed thereto.
Figure 10:
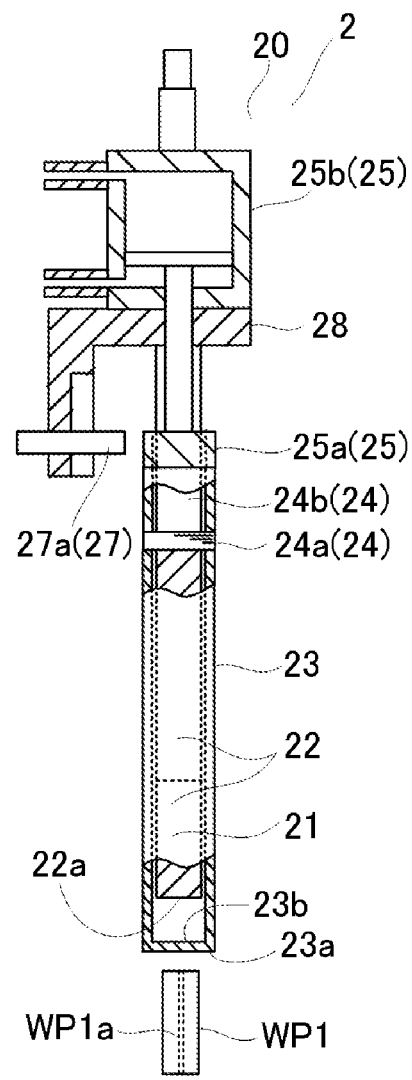
FIG. 10 is a side cross-sectional view schematically illustrating the core adsorption holding part when the core is removed therefrom.
Figure 11:
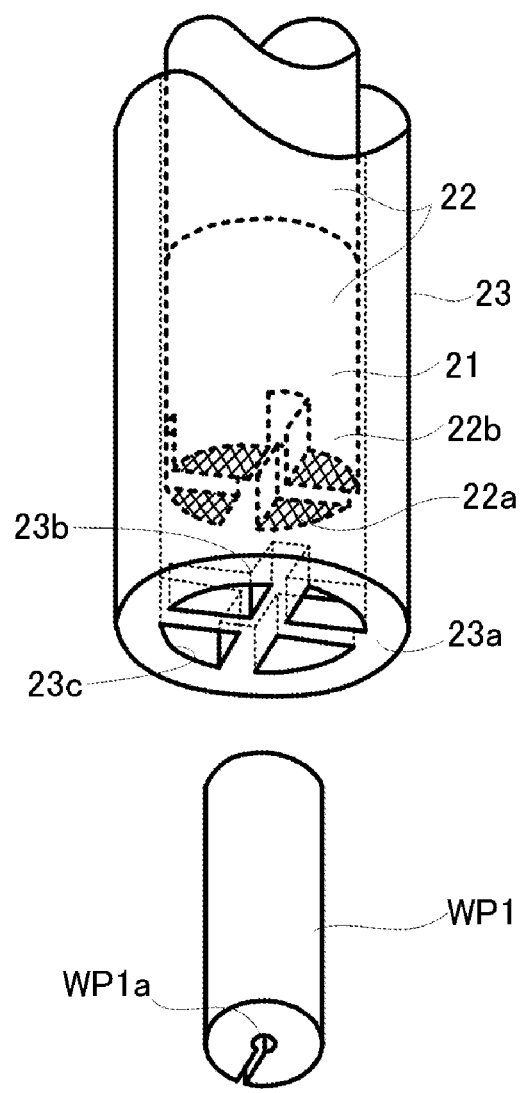
FIG. 11 is a perspective view illustrating a distal end portion of a bottomed cylindrical member according to another embodiment and is a schematic view illustrating the distal end portion of the bottomed cylindrical member when the core is removed against the magnetic force.
Figure 12:
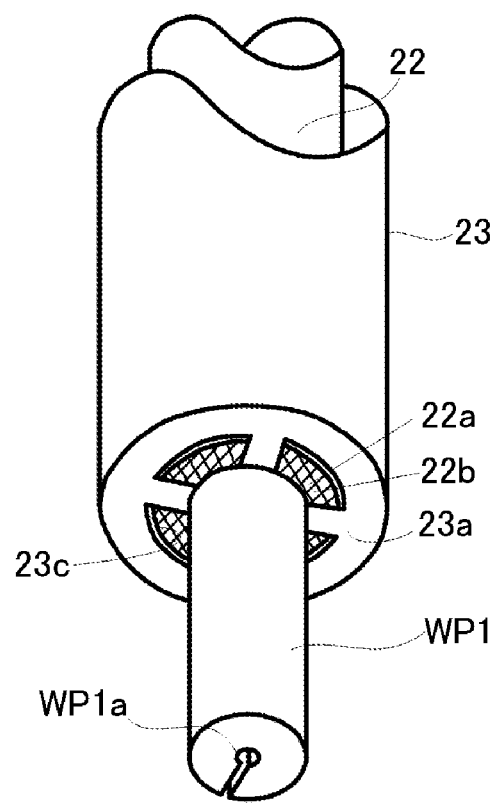
FIG. 12 is a perspective view illustrating the distal end portion of the bottomed cylindrical member according to another embodiment and is a schematic view illustrating the distal end portion of the bottomed cylindrical member when the core is adsorbed by the magnetic force.

Hereinafter, a core moving device of a wire electric discharge machine according to an embodiment of the disclosure will be described in detail with reference to the drawings. FIG. 1 is a front cross-sectional view schematically illustrating the wire electric discharge machine including the core moving device according to an embodiment of the disclosure. FIG. 2 is a side cross-sectional view taken along the line A-A of FIG. 1. FIG. 3 is a schematic view illustrating a state of a core adsorption holding part to which a core is adsorbed. FIG. 4 is a schematic view illustrating a state in which the core adsorption holding part to which the core is adsorbed is raised and the core is extracted out of a workpiece. FIG. 5 is a schematic view illustrating a state in which the core adsorption holding part to which the core is adsorbed is moved above a core recovery bucket and the core is removed from the core adsorption holding part. FIG. 6 is a perspective view schematically illustrating the core adsorption holding part of the core moving device of the disclosure. FIG. 7 is a front cross-sectional view taken along the line B-B of FIG. 6. FIG. 8 is a cross-sectional view taken along the line C-C of FIG. 7 and is a front cross-sectional view schematically illustrating the core adsorption holding part before the core is adsorbed thereto. FIG. 9 is a side cross-sectional view schematically illustrating the core adsorption holding part when the core is adsorbed thereto. FIG. 10 is a side cross-sectional view schematically illustrating the core adsorption holding part when the core is removed therefrom. FIG. 11 is a perspective view illustrating a distal end portion of a cylindrical member according to another embodiment and is a schematic view illustrating the distal end portion of the bottomed cylindrical member when the core is removed against a magnetic force. FIG. 12 is a perspective view illustrating the distal end portion of the bottomed cylindrical member according to another embodiment and is a schematic view illustrating the distal end portion of the bottomed cylindrical member when the core is adsorbed by the magnetic force.

The wire electric discharge machine 1 illustrated in FIG. 1 to FIG. 5 supplies a machining voltage between a workpiece WP and a wire electrode EL from a power supply device (not illustrated) for electric discharge machining, moves the wire electrode EL traveling while being guided by a pair of upper and lower guides relative to the workpiece WP disposed between the pair of upper and lower guides along a desired path, and cuts out a core WP1 of a desired shape from the workpiece WP. For example, in the workpiece WP, as illustrated in FIG. 12, a start hole WP1a is machined in advance in a portion that is to be cut out as the core WP1. The wire electric discharge machine 1 places the wire electrode EL through the start hole WP1a of the workpiece WP and moves the wire electrode EL relative to the workpiece WP from the start hole WP1a to cut the core WP1 cut out of the workpiece WP.

The wire electrode EL is supplied, for example, from a reel (not illustrated) to an upper guide 16a as a fresh wire electrode, travels vertically downward from the upper guide 16a toward a lower guide 18a, and then is recovered by a wire electrode recovery bucket (not illustrated) from the lower guide 18a as a used wire electrode.

The wire electric discharge machine 1 includes a bed 10, a column 11, a saddle 12, a table 13, a machining tank 14, a work stand WS, an upper support part 15, a lower support part 17, a control device 3, and a power supply device (not illustrated) for electric discharge machining. The bed 10 is placed on an installation surface. The column 11 is provided vertically to stand upright at a rear portion of the bed 10. The upper support part 15 and the lower support part 17 are attached to the column 11.

The saddle 12 is provided on the bed 10 and moves on the bed 10 in a Y-axis direction. The table 13 is provided on the saddle 12 and moves on the saddle 12 in an X-axis direction. The control device 3 controls movement of the saddle 12 and the table 13. The X-axis direction is a front-rear direction of the bed 10. The Y-axis direction is a lateral direction of the bed 10. A plane formed by the X-axis and the Y-axis is horizontal.

The machining tank 14 is fixed on the table 13 and moves together with the table 13. The machining tank 14 is filled with a machining fluid. Contaminated machining fluid discharged from the machining tank is temporarily stored in a sub tank (not illustrated). The machining fluid in the sub tank is cleaned of contamination and the temperature of the machining fluid is adjusted to a predetermined temperature, and then the machining fluid is returned to the machining tank 14 at a necessary timing.

The work stand WS is provided in the machining tank 14 and moves together with the machining tank 14. The workpiece WP is fixed to the work stand WS and moves together with the machining tank 14. The workpiece WP moves in the X-axis direction and the Y-axis direction.

The upper support part 15 supports the upper guide part 16. The upper guide part 16 includes the upper guide 16a, an upper conductive body 16b, and an upper machining fluid jet nozzle 16c. The upper guide 16a guides the wire electrode EL above the workpiece WP. The upper conductive body 16b is in contact with the wire electrode EL above the upper guide 16a and connects the wire electrode EL to the power supply device for electric discharge machining. The upper machining fluid jet nozzle 16c is provided at a lower end of the upper guide part 16 and jets the machining fluid supplied from the sub tank onto an upper surface of the workpiece WP. The wire electrode EL may pass through an opening of the upper machining fluid jet nozzle 16c which jets the machining fluid.

The upper support part 15 includes a head 15b, a U-axis moving unit 15u, a V-axis moving unit 15v, and an upper arm 15a in this order from the side of the column 11. The head 15b is provided on the column 11 and moves the U-axis moving unit 15u in a Z-axis direction with respect to the column 11. The U-axis moving unit 15u is provided on the head 15b and moves the V-axis moving unit 15v in the U-axis direction with respect to the head 15b. The V-axis moving unit 15v is provided on the U-axis moving unit 15u and moves the upper arm 15a in the V-axis direction.

The upper arm 15a extends in the Z-axis direction from the V-axis moving unit 15v, and the upper guide part 16 is provided at a lower end thereof. The upper guide part 16 moves in the U-axis direction, the V-axis direction, and the Z-axis direction. The U-axis is parallel to the X-axis. The V-axis is parallel to the Y-axis. A plane formed by the U-axis and the V-axis is parallel to a plane formed by the X-axis and the Y-axis and is horizontal. The Z-axis is perpendicular to the X-axis and the Y-axis and is vertical. The Z-axis direction is a vertical direction of the bed 10.

The wire electrode EL supported obliquely due to horizontal movement of the upper guide 16a relative to the lower guide 18a enables taper-shaped wire electric discharge machining.

The lower support part 17 is disposed below the upper support part 15. The lower support part 17 supports a lower guide part 18. The lower guide part 18 includes the lower guide 18a, a lower conductive body 18b, and a lower machining fluid jet nozzle 18c. The lower guide 18a guides the wire electrode EL below the workpiece WP. The lower conductive body 18b is in contact with the wire electrode EL below the lower guide 18a and connects the wire electrode EL to the power supply device for electric discharge machining. The lower machining fluid jet nozzle 18c is provided at an upper end of the lower guide part 18 and jets the machining fluid supplied from the sub tank onto a lower surface of the workpiece WP. The wire electrode EL may pass through an opening of the lower machining fluid jet nozzle 18c which jets the machining fluid.

The lower support part 17 includes a lower arm 17a. A body portion of the lower arm 17a passes through a through hole 14a which penetrates a tank wall of the machining tank 14 in the Y-axis direction. The through hole 14a slides relative to the machining tank 14 in the X-axis direction. A space between the through hole 14a and the lower arm 17a is sealed such that the lower arm 17a is slidable in the through hole 14a.

The lower arm 17a extends from the column 11 in the Y-axis direction, and the lower guide part 18 is provided at a distal end thereof. The lower guide part 18 is disposed on a lower side of the workpiece WP in the machining tank 14. The lower guide part 18 moves relative to the workpiece WP in the X-axis direction and the Y-axis direction.

The wire electric discharge machine 1 can adjust a distance between the upper guide part 16 and the lower guide part 18 by moving the upper guide part 16 in the vertical direction. The wire electric discharge machine 1 can adjust an inclination of the wire electrode EL between the upper guide part 16 and the lower guide part 18 by moving the upper guide part 16 in the horizontal direction. The wire electric discharge machine 1 disposes the workpiece WP between the upper guide part 16 and the lower guide part 18, moves the workpiece WP relative to the wire electrode EL along a desired path in the machining fluid of the machining tank 14, and cuts out the core WP1 of a desired shape from the workpiece WP.

The upper machining fluid jet nozzle 16c may jet the machining fluid at a predetermined pressure onto the upper surface of the workpiece WP. The lower machining fluid jet nozzle 18c may jet the machining fluid at a predetermined pressure onto the lower surface of the workpiece WP. The upper machining fluid jet nozzle 16c and the lower machining fluid jet nozzle 18c may simultaneously jet the machining fluid.

A clean machining fluid jetted from at least one of the upper machining fluid jet nozzle 16c and the lower machining fluid jet nozzle 18c pushes out and replaces the machining fluid containing machined debris from a machining gap between the wire electrode EL and the workpiece WP. The machining fluid jetted from both the upper machining fluid jet nozzle 16c and the lower machining fluid jet nozzle 18c can prevent an inclination of the core WP1 in the process of cutting the core WP1 out of the workpiece WP and an inclination of the core WP1 immediately after the core WP1 is cut out of the workpiece WP.

The machining fluid jetted from the lower machining fluid jet nozzle 18c can prevent an inclination of the core WP1 in the process of cutting the core WP1 out of the workpiece WP and an inclination of the core WP1 immediately after the core WP1 is cut out of the workpiece WP. The machining fluid jetted from the lower machining fluid jet nozzle 18c can lift the core WP1 cut out of the workpiece WP.

The lower guide part 18 may include a core holding pad 18d between the lower machining fluid jet nozzle 18c and the workpiece WP. A material of the core holding pad 18d is, for example, a resin material. The core holding pad 18d is provided at the upper end of the lower guide part 18 and has an opening through which the machining fluid jetted from the wire electrode EL and the lower machining fluid jet nozzle 18c passes. A surface of the core holding pad 18d on the side of the workpiece WP is as close as possible to the lower surface of the workpiece WP. A plurality of protrusions may be formed on the surface of the core holding pad 18d on the side of the workpiece WP.

The lower guide part 18 moves relative to the core WP1 and moves under the core WP1 cut out of the workpiece WP. The lower machining fluid jet nozzle 18c stops jetting of the machining fluid. The cut-out core WP1 is placed on the core holding pad 18d. When the core WP1 is pulled up out of the workpiece WP, the core WP1 can be simply taken out without being caught.

The control device 3 controls various drive mechanisms or the like of the wire electric discharge machine 1 to cause the wire electric discharge machine 1 to perform various operations.

Hereinafter, a specific configuration of the disclosure will be described. A core moving device 2 of the wire electric discharge machine 1 of the disclosure, for example, takes out the core WP1 which has been cut out of the workpiece WP from the inside of the workpiece WP and then recovers the core WP1 in a core recovery bucket 14b provided in the machining tank 14 of the wire electric discharge machine 1. Hereinafter, the core moving device 2 of the disclosure will be described by taking a device of recovering the core WP1 as an example.

The core moving device 2 of the wire electric discharge machine 1 of the disclosure illustrated in FIG. 6 to FIG. 10 includes a core adsorption holding part 20. The core adsorption holding part 20 includes a magnet 21, a rod member 22, a bottomed cylindrical member 23, and a cylindrical member drive part 25. The magnet 21 is a permanent magnet or an electromagnet.

At least a distal end portion of the rod member 22 is constituted of the magnet 21. The core WP1 is adsorbed to the bottomed cylindrical member 23, which covers the magnet 21, by the magnetic force of the magnet 21 to be held on a distal end surface 23a of the bottomed cylindrical member 23.

The bottomed cylindrical member 23 has a bottom surface 23b on the distal end portion side, and the rod member 22 is inserted into the bottomed cylindrical member 23 from the base end portion side. The bottomed cylindrical member 23, as described below, can reliably remove cores of various sizes and various weights adsorbed to the core adsorption holding part 20 by the magnetic force of the magnet 21 from the core adsorption holding part 20 against the magnetic force of the magnet 21. For example, even if a large magnet 21 that can adsorb a heavy core with a strong magnetic force is mounted on the rod member 22, the bottomed cylindrical member 23 can reliably remove the cores WP1 of various sizes adsorbed to the core adsorption holding part 20 from the core adsorption holding part 20 against the magnetic force of the magnet 21. Furthermore, the bottomed cylindrical member 23 in the embodiment illustrated in FIG. 5 to FIG. 10 is not formed with the opening 23c, as described below, on the bottom surface 23b. Thus, it is very easy to carry out maintenance such as cleaning as the machining fluid does not enter the bottomed cylindrical member 23 when the core WP1 immersed in the machining fluid in the machining tank 14 is recovered.

The bottomed cylindrical member 23 moves forward and backward in the axial direction of the rod member 22 relative to the rod member 22. A forward direction is a direction in which the bottom surface 23b in the bottomed cylindrical member 23 is separated from the distal end surface 22a of the rod member 22. A backward direction is a direction in which the bottom surface 23b in the bottomed cylindrical member 23 approaches the distal end surface 22a of the rod member 22.

A material of the cylindrical member 23 may be a nonmagnetic material not attracted to the magnet 21, such as plastic, nonmagnetic metal, or nonmagnetic ceramic, for example. The thickness between the distal end surface 23a of the cylindrical member 23 and the bottom surface 23b in the bottomed cylindrical member 23 in the embodiment illustrated in FIG. 6 to FIG. 10 may be formed, for example, in such a dimension that allows the core WP1 to be adsorbed to the distal end surface 23a of the bottomed cylindrical member 23 by the magnetic force of the magnet 21 when the distal end surface 22a of the rod member 22 is brought into contact with the bottom surface 23b in the bottomed cylindrical member 23.

The bottomed cylindrical member 23 moves backward until the bottom surface 23b in the bottomed cylindrical member 23 comes into contact with the distal end surface 22a of the rod member 22. The core WP1 is adsorbed to the distal end surface 23a of the bottomed cylindrical member 23 by the magnetic force of the magnet 21. If the core WP1 can be adsorbed to the distal end surface 23a of the bottomed cylindrical member 23 by the magnetic force of the magnet 21, the bottomed cylindrical member 23 may simply bring the bottom surface 23b in the bottomed cylindrical member 23 closer to the distal end surface 22a of the rod member 22.

The bottomed cylindrical member 23 moves forward to a distance where the core WP1 adsorbed to the distal end surface 23a of the bottomed cylindrical member 23 by the magnetic force of the magnet 21 cannot be held by the magnetic force of the magnet 21. The core WP1 is pushed out against the magnetic force of the magnet 21 and removed from the distal end surface 23a of the bottomed cylindrical member 23.

The bottomed cylindrical member 23 may include a movement restricting member 24. The movement restricting member 24 restricts forward movement of the distal end surface 23a of the bottomed cylindrical member 23 beyond a predetermined distance from the distal end surface 22a of the rod member 22. The predetermined distance between the distal end surface 23a of the bottomed cylindrical member 23 and the distal end surface 22a of the rod member 22 when the bottomed cylindrical member 23 moves forward until being restricted by the movement restricting member 24 may be set to a distance at which the core WP1 is not attracted to the magnet 21 on the distal end portion of the separated rod member 22 by the magnetic force. In addition, according to the embodiment illustrated in FIG. 6 to FIG. 10, the movement restricting member 24 restricts the bottom surface 23b in the bottomed cylindrical member 23 and the distal end surface 22a of the rod member 22 from being separated beyond the predetermined distance. The predetermined distance between the bottom surface 23b in the bottomed cylindrical member 23 and the distal end surface 22a of the rod member 22 when the bottomed cylindrical member 23 is separated until being restricted by the movement restricting member 24 may be set to a distance at which the core WP1 is not attracted to the magnet 21 on the distal end portion of the separated rod member 22 by the magnetic force.

The movement restricting member 24 may be constituted by, for example, a key member 24a penetrating the rod member 22 and the bottomed cylindrical member 23 perpendicularly to the axis of the rod member 22, and an elongated hole 24b which is formed in the rod member 22, through which the key member 24a is inserted and which allows the key member 24a to move parallel to the axial direction of the rod member 22 by only the predetermined distance. The movement restricting member 24 is not limited only to the embodiment, and various configurations can be applied as long as the movement restricting member 24 can perform a function of restricting the movement.

The cylindrical member drive part 25 moves the bottomed cylindrical member 23 at least forward. The cylindrical member drive part 25 may include, for example, a push member 25a and a push member drive source 25b. The push member 25a is connected to a drive shaft of the cylindrical member drive part 25. The push member 25a is moved forward from a retreat position by the push member drive source 25b to move the bottomed cylindrical member 23 forward and is moved backward to return to the retreat position by the push member drive source 25b leaving the bottomed cylindrical member 23. The cylindrical member drive part 25 is not limited to the embodiment and may move the bottomed cylindrical member 23 forward and backward. Drive sources of various types such as a pneumatic actuator, a hydraulic actuator, or an electric motor may be employed as appropriate for a drive source of the cylindrical member drive part 25.

The core adsorption holding part 20 moves the bottomed cylindrical member 23 backward relative to the rod member 22 to bring the distal end surface 22a of the rod member 22 into contact with or close to the bottom surface 23b in the bottomed cylindrical member 23. The distal end surface 23a of the bottomed cylindrical member 23 can adsorb the core WP1 with the magnetic force of the magnet 21 covered by the bottomed cylindrical member 23. The core adsorption holding part 20 moves the bottomed cylindrical member 23 forward relative to the rod member 22 until it is restricted by the movement restricting member 24, and pushes out the core WP1 against the magnetic force by the bottomed cylindrical member 23 so that the core WP1 is separated from the magnet 21 on the distal end portion of the rod member 22 by the predetermined distance. When the core WP1 is separated from the distal end surface 22a of the rod member 22 by the predetermined distance, the core WP1 cannot be adsorbed by the magnetic force of the magnet 21 and is removed from the distal end surface 23a of the bottomed cylindrical member 23.

Further, the core adsorption holding part 20 may include a core adsorption detector 27. The core adsorption detector 27 detects whether or not the core WP1 is adsorbed to the distal end surface 23a of the bottomed cylindrical member 23 by the magnetic force of the magnet 21 of the rod member 22. The core adsorption detector 27 may output a signal indicating, for example, that the bottomed cylindrical member 23 has moved backward relative to the rod member 22 until the distal end surface 22a of the rod member 22 is in contact with the bottom surface 23b in the bottomed cylindrical member 23 or close thereto in the predetermined distance.

The core adsorption detector 27 may include, for example, a proximity sensor 27a or a contact sensor (not illustrated). The proximity sensor 27a or the contact sensor may be attached to a position that faces the base end portion of the bottomed cylindrical member 23 when the distal end surface 22a of the rod member 22 comes into contact with the bottom surface 23b in the bottomed cylindrical member 23 or approaches to reach the predetermined distance so that the core WP1 is adsorbed to the distal end surface 23a of the bottomed cylindrical member 23. The proximity sensor 27a detects proximity of the base end portion of the bottomed cylindrical member 23 in a non-contact manner. The contact sensor detects proximity of the base end portion of the bottomed cylindrical member 23 by contact.

The core adsorption holding part 20 may include a support member 28. The base end portion of the rod member 22 and the push member drive source 25b are attached to the support member 28. The proximity sensor 27a or the contact sensor of the core adsorption detector 27 is attached to the support member 28. The push member 25a may be formed with a hole, through which the rod member 22 slides, and may be moved forward and backward between the support member 28 and the base end surface of the bottomed cylindrical member 23.

The core moving device 2 includes a core adsorption holding part drive means for moving the core adsorption holding part 20 relative to the workpiece WP in the X-axis direction, the Y-axis direction, and the Z-axis direction. The core moving device 2 may have the core adsorption holding part 20 attached to the upper arm 15a and move the core adsorption holding part 20 relative to the workpiece WP using various drive parts of the wire electric discharge machine 1 for moving the wire electrode EL relative to the workpiece WP and various drive parts of the wire electric discharge machine 1 for moving the upper guide part 16 relative to the lower guide part 18 as the core adsorption holding part drive means. The core moving device 2 may use both the various drive parts provided in the wire electric discharge machine 1 and a dedicated drive part for the core adsorption holding part as the core adsorption holding part drive means.

The core moving device 2 of the disclosure may be configured, for example, as illustrated in FIG. 1 to FIG. 5. The rod member 22 is disposed vertically, that is, in the Z-axis direction, with the base end portion up and the distal end portion down. The bottomed cylindrical member 23 moves relative to the rod member 22, and can be lowered by its own weight until it is restricted by the movement restricting member 24 and can be raised by an external force against its own weight.

In the core adsorption holding part 20, a vertical drive shaft 29a of a vertical drive part 29, which is one of the core adsorption holding part drive means, is connected to the support member 28. The vertical drive part 29 is attached to the upper arm 15a of the wire electric discharge machine 1. The core adsorption holding part 20 moves vertically in the Z-axis direction by the vertical drive part 29. In further addition, the core adsorption holding part 20 can also move vertically in the Z-axis direction by a drive part for moving the upper arm 15a vertically, which is one of the core adsorption holding part drive means. The core adsorption holding part 20 moves back and forth and left and right in the X-axis direction and the Y-axis direction by a drive part that moves the upper arm 15a back and forth and left and right, which is one of the core adsorption holding part drive means. In further addition, the core adsorption holding part 20 can also move back and forth and left and right relative to the workpiece WP in the X-axis direction and the Y-axis direction by a drive part of the table 13 moving left and right relative to the upper arm 15a and a drive part of the saddle 12 moving back and forth relative to the upper arm 15a.

The core moving device 2 of the disclosure includes a core movement control device 30. The core movement control device 30 controls various drive mechanisms of the core moving device 2 to cause the core moving device 2 to perform various operations. The control device 3 of the wire electric discharge machine 1 may include the core movement control device 30.

The core moving device 2 of the wire electric discharge machine 1 of the disclosure operates, for example, as follows. First, as illustrated in FIG. 1, the wire electric discharge machine 1 cuts out the core WP1 from the workpiece WP using wire electric discharge machining. Next, as illustrated in FIG. 2, the wire electric discharge machine 1 cuts the wire electrode EL above the upper guide 16a with a wire part (not illustrated). The wire electrode EL on the side of the lower guide part 18 is recovered to a wire electrode recovery box (not illustrated) after being cut. The lower guide part 18 moves relative to the workpiece WP and moves the core holding pad 18d provided on the lower guide part 18 under the core WP1. The core WP1 is held on the core holding pad 18d. The upper arm 15a is raised to move the upper guide part 16 to a predetermined position.

As illustrated in FIG. 2, the core moving device 2 moves the upper arm 15a in the horizontal direction to move the core adsorption holding part 20 above the core WP1. The core moving device 2 lowers the core adsorption holding part 20 by the vertical drive part 29. As illustrated in FIG. 7 and FIG. 8, the bottomed cylindrical member 23 moves forward from the distal end surface 22a of the rod member 22 to the position at the predetermined distance by its own weight until it is restricted by the movement restricting member 24.

In the core adsorption holding part 20 being lowered, the distal end surface 23a of the bottomed cylindrical member 23 first comes into contact with the upper surface of the core WP1. In the core adsorption holding part 20 being further lowered, the bottomed cylindrical member 23 is raised relative to the rod member 22 being lowered. As illustrated in FIG. 9, the core adsorption holding part 20 being further lowered is stopped at a position at which the distal end surface 22a of the rod member 22 comes into contact with the bottom surface 23b in the bottomed cylindrical member 23. A distance in which the core adsorption holding part 20 is lowered can be set in advance. The core adsorption holding part 20 being lowered may be stopped when the core adsorption detector 27 detects that the distal end surface 22a of the rod member 22 is in contact with the bottom surface 23b in the bottomed cylindrical member 23. The core adsorption holding part 20 being lowered may be stopped when the driving force at the time of the lowering exceeds a predetermined driving force or when the core adsorption holding part 20 cannot be lowered over a predetermined time during the lowering.

When the base end portion of the moving bottomed cylindrical member 23 reaches a position facing the proximity sensor 27a, the core adsorption detector 27 outputs an ON signal indicating that the core WP1 is adsorbed by the magnetic force of the magnet 21 on the distal end portion of the rod member 22.

The core moving device 2 receives the ON signal of the core adsorption detector 27 and then moves the upper arm 15a upward to raise the core adsorption holding part 20. As illustrated in FIG. 4, the core adsorption holding part 20 rises to a height at which it does not interfere with other objects even when the core WP1 is moved back and forth and left and right to a position above the core recovery bucket 14b. When a movement distance only by the movement of the upper arm 15a is insufficient, the core adsorption holding part 20 may be moved by combining a plurality of drive parts, such as being moved in the vertical direction by the vertical drive part 29. At this time, when the bottomed cylindrical member 23 is lowered by its own weight and the core adsorption detector 27 indicates an OFF signal, it can be detected that the core WP1 cannot be adsorbed by the magnetic force of the magnet 21 on the distal end portion of the rod member 22. If the core WP1 cannot be adsorbed by the magnetic force of the magnet 21, it may be returned to the operation of adsorbing the core WP1 with the magnetic force of the magnet 21 on the distal end portion of the rod member 22 again, or an alarm may be issued to stop the core moving device 2 or the wire electric discharge machine 1.

As illustrated in FIG. 5, the core moving device 2 moves the core adsorption holding part 20 in the horizontal direction until the core WP1 is above the core recovery bucket 14b. The core adsorption holding part 20 may be lowered into the core recovery bucket 14b if necessary. When a movement distance only by the movement of the upper arm 15a is insufficient, the core adsorption holding part 20 may be moved by combining a plurality of drive parts, such as causing the machining tank 14 including the core recovery bucket 14b to move in the horizontal direction.

As illustrated in FIG. 10, the core adsorption holding part 20 lowers the push member 25a at the retreat position. The bottomed cylindrical member 23 is pushed by the push member 25a being lowered and is lowered relative to the rod member 22 until it is restricted by the movement restricting member 24. The core WP1 is separated to a position where the core WP1 is not attracted by the magnetic force of the magnet 21 on the distal end portion of the rod member 22 and drops into the core recovery bucket 14b due to its own weight. The push member 25a rises to the retreat position.

At this time, if the core adsorption detector 27 indicates an OFF signal, it is detected that the core WP1 has dropped. Also, at this time, if the core adsorption detector 27 indicates an ON signal, it can be detected that the core WP1 pushes up the bottomed cylindrical member 23 without being dropped and is attracted and adsorbed again by the magnetic force of the magnet 21 on the distal end portion of the rod member 22. If the core WP1 has not dropped, it may be returned to the operation of removing the core WP1 from the core adsorption holding part 20 again, or an alarm may be issued to stop the core moving device 2 or the wire electric discharge machine 1.

After the core WP1 is removed from the core adsorption holding part 20, the core moving device 2 raises the core adsorption holding part 20 to a height at which the core adsorption holding part 20 does not interfere with other objects. The core moving device 2 performs extraction of the core WP1 again in the next wire electric discharge machining.

As illustrated in FIG. 11, the core moving device 2 of the disclosure may include a cylindrical member 23 in another form. The bottomed cylindrical member 23 may have at least one opening 23c, with a part of the bottom surface 23b left, on the distal end portion of the bottomed cylindrical member 23. For example, four openings 23c are formed, leaving two linear areas that intersect at the center of the bottom surface 23b in the bottomed cylindrical member 23, on the distal end portion of the bottomed cylindrical member 23 illustrated in FIG. 11. The bottomed cylindrical member 23 can reliably remove cores WP1 of various sizes adsorbed to the core adsorption holding part 20 by the magnetic force of the magnet 21 from the core adsorption holding part 20 against the magnetic force of the magnet 21 with the portion excluding the openings 23c formed on the distal end portion of the bottomed cylindrical member 23. In addition, even if a large magnet 21 that can adsorb a heavy core with a strong magnetic force is mounted on the rod member 22, the bottomed cylindrical member 23 can reliably remove the cores WP1 of various sizes adsorbed to the core adsorption holding part 20 from the core adsorption holding part 20 against the magnetic force of the magnet 21. The distal end portion of the rod member 22 may be in a shape having a protrusion 22b (to be described below) as illustrated in FIG. 12, or various shapes may be used such as a flat surface as illustrated in FIG. 6 to FIG. 10.

Furthermore, as illustrated in FIG. 11 and FIG. 12, the core moving device 2 of the disclosure may include a rod member 22 in another form. The rod member 22 may have at least one protrusion 22b, which is exposed from the opening 23c of the bottomed cylindrical member 23 when the bottomed cylindrical member 23 moves backward, on the distal end portion of the rod member 22. At least the distal end portion of the protrusion 22b is constituted of the magnet 21. The protrusion 22b can come into contact with the core WP1 when the core WP1 is adsorbed by the magnetic force of the magnet 21. The magnet 21 of the protrusion 22b can sufficiently adsorb the core WP1 even with a small magnetic force. For example, the distal end portion of the rod member 22 illustrated in FIG. 11 is formed with four protrusions 22b that can be respectively inserted into and extracted from the four openings 23c opened on the distal end portion of the bottomed cylindrical member 23. The distal end surface 22a of the rod member 22 may be illustrated as the distal end surface of the protrusion 22b exposed from the opening 23c of the bottomed cylindrical member 23 as illustrated in FIG. 11 and FIG. 12. In addition, the distal end surface 22a of the rod member 22 may be illustrated as a portion around the protrusion 22b and a surface from which the protrusion 22b protrudes.

When the core moving device 2 moves the cylindrical member 23 backward relative to the rod member 22, the bottom surface 23b of the bottomed cylindrical member 23 comes close to or into contact with the portion around the protrusion 22b on the distal end portion of the rod member 22. For example, as illustrated in FIG. 11, the core moving device 2 lowers the core adsorption holding part 20 from above the core WP1 toward the core WP1. When the bottomed cylindrical member 23 comes into contact with the core WP1, the bottomed cylindrical member 23 starts moving backward relative to the rod member 22. As illustrated in FIG. 12, when the bottom surface 23b of the bottomed cylindrical member 23 is in contact with the portion around the protrusion 22b of the rod member 22 or close thereto in the predetermined distance, the core moving device 2 stops lowering the core adsorption holding part 20. The core moving device 2 moves the core adsorption holding part 20, to which the core WP1 is adsorbed by the magnetic force of the magnet 21, to a position above the core recovery bucket 14b. As illustrated in FIG. 11, the core adsorption holding part 20 moves the bottomed cylindrical member 23 forward relative to the rod member 22 with the cylindrical member drive part 25 to push out the core WP1 against the magnetic force of the magnet 21 and remove the core WP1. The core WP1 enters the core recovery bucket 14b.

The core moving device 2 of the wire electric discharge machine 1 of the disclosure has a simple configuration in which the rod member 22 is inserted into the bottomed cylindrical member 23, and cores WP1 of various sizes and various weights adsorbed by the magnetic force of the magnet 21 can be reliably removed against the magnetic force of the magnet 21 at the predetermined timing. The core moving device 2 of the wire electric discharge machine 1 of the disclosure can omit the process of replacing the bottomed cylindrical member 23, the rod member 22, and the magnet 21 with those having the required sizes according to the size or weight of the core WP1. Since whether or not the core WP1 is adsorbed to the core adsorption holding part 20 is easily detected by detecting the position of the cylindrical member 23 with respect to the rod member 22 using a mechanism of removing the core WP1 from the magnet 21, the core moving device 2 of the wire electric discharge machine 1 of the disclosure can reliably move the core WP1. The core moving device 2 of the wire electric discharge machine 1 of the disclosure is also capable of automatically moving the core WP1 which has been cut out of the workpiece WP using wire electric discharge machining.

The embodiment was chosen in order to explain the principles of the disclosure and its practical application. Many modifications and variations are possible in light of the above teachings. It is intended that the scope of the disclosure be defined by the claims.

What is claimed is:

1. A core moving device of a wire electric discharge machine, comprising:
   a core adsorption holding part which adsorbs a core cut out of a workpiece with a magnetic force of a magnet and moves the core relative to the workpiece,
   wherein the core adsorption holding part comprises:
   a rod member, at least a distal end portion of which is constituted of the magnet;
   a bottomed cylindrical member which has a bottom surface on a distal end portion side and into which the rod member is inserted from a base end portion side, wherein the bottomed cylindrical member, on one hand, moves backward relative to the rod member to the base end portion side of the rod member to be capable of adsorbing the core with the magnetic force of the magnet and, on the other hand, moves forward relative to the rod member to the distal end portion side of the rod member to be capable of pushing out and removing the core adsorbed by the magnetic force of the magnet against the magnetic force;

a cylindrical member drive part which moves the bottomed cylindrical member forward relative to the rod member to at least the distal end portion side of the rod member; and a core adsorption detector which detects whether a position of the bottomed cylindrical member with respect to the rod member is at a position when the core is adsorbed to the core adsorption holding part by the magnetic force of the magnet.

2. The core moving device of the wire electric discharge machine according to claim 1, wherein the bottomed cylindrical member has at least one opening, with a part of the bottom surface left, on a distal end portion of the bottomed cylindrical member.

3. The core moving device of the wire electric discharge machine according to claim 2, wherein the rod member comprises at least one protrusion, which is exposed from the opening when the bottomed cylindrical member moves backward, on the distal end portion of the rod member.

4. The core moving device of the wire electric discharge machine according to claim 1, comprising a movement restricting member that restricts forward movement of a distal end surface of the bottomed cylindrical member beyond a predetermined distance from a distal end surface of the rod member, wherein the movement restricting member comprises an elongated hole and a key member, the elongated hole is formed in the rod member, and the key member penetrates the rod member and the cylindrical member and is inserted through the elongated hole.

5. The core moving device of the wire electric discharge machine according to claim 1, comprising a core movement controller which controls the cylindrical member drive part based on an output signal of the core adsorption detector.

6. The core moving device of the wire electric discharge machine according to claim 1, wherein the rod member is vertically disposed with a base end portion up and the distal end portion down.

7. The core moving device of the wire electric discharge machine according to claim 6, wherein the bottomed cylindrical member is lowered by a weight of the bottomed cylindrical member.

8. The core moving device of the wire electric discharge machine according to claim 1, comprising a support member to which the base end portion of the rod member is attached and which moves relative to the workpiece together with the rod member.

9. The core moving device of the wire electric discharge machine according to claim 8, wherein the cylindrical member drive part comprises:

a push member which moves forward from a retreat position to push out the bottomed cylindrical member in a forward direction and then moves backward to return to the retreat position leaving the bottomed cylindrical member; and a push member drive source which is attached to the support member and drives the push member forward and backward, wherein the push member drive source comprises a pneumatic actuator, a hydraulic actuator or an electric motor.

10. The core moving device of the wire electric discharge machine according to claim 8, wherein the core adsorption detector is attached to the support member and comprises:

a proximity sensor or a contact sensor which is attached to a position that faces the base end portion of the bottomed cylindrical member when the core is adsorbed to the core adsorption holding part by the magnetic force of the magnet, wherein the proximity sensor detects proximity of the base end portion of the bottomed cylindrical member in a non-contact manner, and the contact sensor detects proximity of the base end portion of the bottomed cylindrical member by contact.

* * * * *